United States Patent Office 3,544,552
Patented Dec. 1, 1970

3,544,552
3-PHOSPHATE ESTERS OF LINCOMYCIN
Alexander D. Argoudelis, Portage, and John H. Coats, Kalamazoo, Mich., assignors to The Upjohn Company, Kalamazoo, Mich., a corporation of Delaware
No Drawing. Filed Oct. 18, 1968, Ser. No. 768,879
Int. Cl. C07c 47/18
U.S. Cl. 260—210                    14 Claims

ABSTRACT OF THE DISCLOSURE

This invention relates to novel antibacterial compounds and to processes for preparing them. It is particularly directed to novel 3-phosphate esters of lincomycin, and of analogs thereof, and of celesticetins. The compounds of the invention can be shown by the following formula:

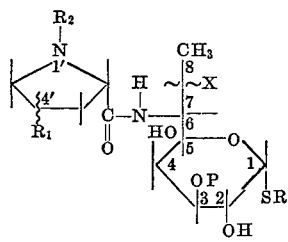

wherein R is $CH_3$, $C_2H_5$ or

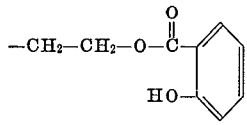

$R_1$ is H, or cis or trans lower-alkyl of from 1 to 8 carbon atoms, inclusive; $R_2$ is H, $CH_3$, or $C_2H_5$; X is OH, chlorine, or bromine, each in the (R) or (S) configuration, or —$OCH_3$; and, P is

and salts thereof.

Examples of alkyl of from 1 to 8 carbon atoms are methyl, ethyl, propyl, butyl, pentyl, hexyl, heptyl, and octyl and isomers thereof.

BRIEF SUMMARY OF THE INVENTION

The novel compounds of the invention are prepared by incorporating a compound, as defined in Formula I, wherein P at the 3-position of the molecule is hydrogen, in a Streptomyces fermentation, or incubating said compound in a cell-free extract from a Streptomyces culture, and transforming the compound into a novel phosphate 3-ester. Heretofore, phosphorylation on the 3-position of the lincomycin or celesticetin (wherein R is

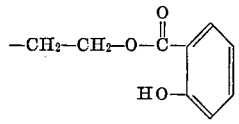

$R_1$ and $R_2$ are H, and X is —$OCH_3$) molecule was unknown and there is no know prior art method for accomplishing such a phosphorylation. Lincomycin-2-phosphate esters are prepared by chemical synthesis by first condensing lincomycin or analogs thereof with an aromatic aldehyde to produce 3,4-O-arylidene lincomycin. This compound is tritylated, if it contains a 7-hydroxy group, to form 7-O-trityl-3,4-O-arylidene lincomycin which is then phosphorylated to form the corresponding 3,4-O-arylidene lincomycin-2-phosphate. Upon removal of the protective groups there is obtained lincomycin-2-phosphate or analogues thereof. As is evident, the above process cannot be used to produce a lincomycin-3-phosphate since the condensation step with an aromatic aldehyde covers up the 3-position of the lincomycin molecule.

The compounds of the invention, though antibacterially inactive in vitro, are activated when used in vivo. Presumably, this activation in vivo is comparable to the reactivation of the lincomycin compound in vitro by contacting the phosphorylated lincomycin compound with alkaline prosphatase. The compounds of the invention are particularly useful for oral administration to animals, including mammals, because they lack the bitter taste of lincomcyin.

DETAILED DESCRIPTION

The lincomycin compounds, herein defined as starting materials, can be prepared by procedures disclosed in various patents, publications and patent applications. These are as follows:

Lincomycin—U.S. Pat. 3,086,912
  With reference to Formula I, wherein:

R=methyl or ethyl—U.S. Pat. 3,380,992 (specification and Example 12)
$R_1$=cis or trans alkyl to 8 carbon atoms—U.S. Pat. 3,380,992 (specification and Example 1)
$R_2$=hydrogen or alkyl to 8 carbon atoms—U.S. Pat. 3,380,992 (specification and Example 1E and 1G+H)
X=(S)CH—U.S. Pat. 3,380,992 (specification and Example 11–D)
X=(R) or (S) Cl or Br—Belgium Pat. 676,202 U.S. application Ser. No. 498,989, filed Oct. 20, 1965
X=(R) or (S)—Application Ser. No. 696,518, filed Jan. 9, 1968
Celesticetin—U.S. Pat. 2,928,844

4'-depropyl-4'-ethyl lincomycin, wherein R is $CH_3$, $R_1$ is ethyl, $R_2$ is $CH_3$, and X is OH in formula I can be prepared by the procedure disclosed in Examples 1 and 2 of U.S. Pat. 3,359,164 wherein said compound is named lincomycin B.

1'-demethyl-1'-ethyl lincomycin, wherein R is $CH_3$, $R_1$ is n-propyl, $R_2$ is ethyl, and X is OH in Formula I can be prepared by the procedure disclosed in Examples 1 and 2 of U.S. Pat. 3,359,163 wherein said compound is named lincomycin C.

1'-demethyl lincomycin, wherein R is $CH_3$, $R_1$ is n-propyl, $R_2$ is H and X is OH in Formula I can be prepared by the procedure disclosed in Example 1 of U.S. Pat. 3,329,568 wherein said compound is named lincomycin D.

Of the above compounds, the compound 7(S)-chloro-7-deoxylincomycin is also presently known by the generic name "clinimycin."

The lincomycin compounds or analogs thereof, and celesticetin, as described above, can be phosphorylated by incorporating the unphosphorylated compound in a Streptomyces fermentation containing a phosphorylating enzyme, or incubating the unphosphorylated compound with a cell-free extract from a Streptomyces cultures wherein said cell-free extract contains the necessary phosphorylating enzyme. For example, upon adding lincomycin hydrochloride to a Streptomyces rochei, NRRL 3512, fermentation there is produced lincomycin 3-phosphate; upon adding clinimycin hydrochloride, there is obtained clinimycin 3-phosphate. Upon incubating lincomycin with a cell-free extract from a Streptomyces culture, there is obtained lincomycin-3-phosphate; upon incubating clinimycin with a cell-free extract from a Streptomyces culture, there is obtained clinimycin-3-phosphate.

The fermentation to make the novel compounds of the invention can be conducted in an aqueous nutrient medium under submerged aerobic conditions. It is to be understood also that for the preparation of limited amounts of phosphorylated compounds, surface cultures and bottles can be employed. The organism used in the fermentation is grown in a nutrient medium containing a carbon source, for example, an assimilable carbohydrate and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solubles, animal peptone liquors, meat and bone scraps, and the like. Combinations of these carbon and nitrogen sources can be used advantageously. Trace metals, for example, zinc, magnesium, manganese, cobalt, iron and the like need not be added to the fermentation media since tap water and unpurified ingredients are used as media components.

Phosphorylation of the novel compounds of the invention can be effected at any temperature conducive to satisfactory growth of the Streptomyces culture, for example, between about 18° and 40° C., and preferably between about 20° and 37° C.

When a Streptomyces fermentation, as described above, is used to phosphorylate lincomycin or an analog thereof, as herein defined, or celesticetin, on the 3 position of the molecule, the lincomycin or celesticetin compound (Unphosphorylated compound) can be added prior to inoculation of the fermentation medium. Alternatively, the unphosphorylated compound can be added in small increments during the fermentation cycle so long as the addition is not too late in the fermentation cycle to accomplish the desired phosphorylation of all the unphosphorylated compound added. The time and amounts of addition of the unphosphorylated compound can easily be determined for each fermentation by adding the unphosphorylated compound until some toxicity is observed, such as inhibition of the phosphorylation. Also, if at the end of the fermentation cycle there remains unphosphorylated compound, then smaller levels of unphosphorylated compound should be used and/or the time of addition should be altered.

An alternate procedure for phosphorylating lincomycin or an analog thereof, or celesticetin, is by incubating a cell-free extract of a Streptomyces culture, containing the necessary phosphorylating enzyme, with the compound to be phosphorylated. The cell-free extract can be prepared from a 24-hour old Streptomyces culture. The incubation can be conducted at a temperature of 26° C. to 32° C. The time of the incubation will vary with the amount of compound being phosphorylated. For example, an incubation time of less than 24 hours is sufficient to phosphorylate 50 γ/ml. lincomycin to lincomycin-3-phosphate.

When a cell-free Streptomyces culture extract is used to phosphorylate a compound as defined herein, the amount of the unphosphorylated compound which can be added will depend on the capacity of the culture extract to phosphorylate all the compound added. This level can be determined by gradually adding higher levels of the unphosphorylated compound to the culture extract until there is evidence that the unphosphorylated compound being added is not being phosphorylated. Since the in vitro antibacterial activity of the unphosphorylated compound is lost upon phosphorylation at the 3 position of the molecule, the presence of in vitro antibacterial activity in a culture extract 24 hours after addition of the unphosphorylated compound is evidence that the capacity of the culture extract to phosphorylate the unphosphorylated compound has been exceeded. The in vitro antibacterial activity, mentioned above, can be ascertained on a standard microbiological plate assay against the microorganism Sarcina lutea.

A variety of procedures can be employed in the isolation and purification of the novel compounds in the subject invention, for example, solvent extraction, liquid-liquid distribution in a Craig apparatus, liquid ion exchange extraction, adsorption on a suitable adsorbent, for example, carbon, and column chromatography. In a preferred recovery process, the novel phosphorylated compounds are isolated from a fermentation beer, or cell-free extract system, as herein described, by filtration. The filtrate is then passed over a suitable adsorbent, for example, activated carbon or Amberlite XAD–2 (a resin sold by Rohm and Haas Co.) to remove water-soluble impurities which may interfere with the subsequent chromatography step. The eluate from the carbon or Amberlite XAD–2 resin is then passed through a chromatography column containing an anion exchange resin, for example, Dowex-1 (X–4) in the acetate form (sold by Dow Chemical Co., Midland, Mich.). Fractions are collected from the chromatography column and assayed for activity against the microorganism S. lutea before and after treatment of the fractions with alkaline phosphatase as hereinafter described. Fractions having the highest activity against S. lutea upon test with alkaline phosphatase are pooled, concentrated, then subjected to counter current distribution in a Craig apparatus using a solvent system consisting of n-butanol-water (1:1 v./v.).

Lincomycin 3-phosphate and the 3-phosphate of lincomycin analogues are essentially inactive against bacterial in vitro, Thus, these novel phosphate compounds are detected in in vitro reaction mixtures, such as described above, by treating hydrolysates, or other mixtures containing the 3-phosphate compounds, with alkaline phosphatase. For example, the reaction mixture for the action of alkaline phosphatase on lincomycin-3-phosphate consists of 0.5 ml. Tris buffer (0.5 M.), pH 8.0, 0.5 ml. alkaline phosphatase (1 mg./ml.) stock made up in tris buffer (0.5 M.), pH 8.0, 0.05 ml. (50 mcg.) of the lincomycin-3-phosphate. This reaction mixture is incubated overnight at 28° C. The phosphatase removes the 3-phosphate group and the lincomycin compound then shows antibacterial activity in vitro.

Illustrative of Steptomyces which can be used to prepare the novel compounds of the invention are S. rochei, NRRL 3512; S. vendergensis, NRRL 3530; S. coelicolor 1946, NRRL 3531; S. coelicolor Müller, NRRL 3532; Actinomyces (Streptomyces) cylindrosporus 3166 CCM, NRRL 3535; Actinomyces (Streptomyces) cyaneofuscatus, NRRL 3534; S. rochei, NRRL 3533; and S. armentosus, NRRL 3176. These cultures are available, without restriction, from the Northern Utilization and Research Division, Agricultural Research Service, U.S. Department of Agriculture, Peoria, Ill., U.S.A.

It has been found that clinimycin is phosphorylated in whole cell systems most readily in comparison with lincomycin and other lincomycin and clinimycin analogs, for example 1'-dimethylclinimycin and 1'-demethyl-4'-pentyl clinimycin. When a cell-free extract of a Streptomyces culture is used, all starting compounds of the invention are phosphorylated with equal facility.

The novel compounds of the invention are amphoteric compounds and can exist in different ionic forms according to the pH of the environment. At low pH the compounds exist in the acid-addition salt form, at a higher pH in a zwitterion form, and at a still higher pH in a metal salt form. The latter can be a neutral salt (two equivalents of base for each mole of lincomycin-3-phosphate), an acid or mono salt (one equivalent of base for each mole of lincomycin-3-phosphate), or a hemi salt (one-half equivalent of base for each mole of lincomycin-3-phosphate). By addition of appropriate amounts of suitable acids and bases, any of these various forms can be isolated. The acid addition salts include those of strong organic or inorganic acids having a pK equal to or less than that of phosphate, for example, hydrochloric, sulfuric, phosphoric, and like acids.

Acid and neutral salts include the alkaline metal (including ammonia) and alkaline earth metal (including magnesium and aluminum) salts obtained by neutralizing an acid form with the appropriate base, for example, ammonium hydroxide, sodium and potassium hydroxides, or alkoxides, calcium, or magnesium hydroxides, and the like. The acid and neutral salts also include amine salts obtained by neutralizing an acid form with a basic amine, for example, mono-, di-, and trimethylamines, mono-, di-, and triethylamines, mono-, di-, and tripropylamines (iso- and normal), ethyldimethylamine, benzyldiethylamine, cyclohexylamine, benzylamine, dibenzylamine, N,N'-dibenzylethylenediamine, bis-(ortho - methoxy - phenylisopropyl)amine, and the like lower-aliphatic, lower-cycloaliphatic, and lower-araliphatic amines, the lower aliphatic and lower-cycloaliphatic radicals containing up to and including eight carbon atoms; heterocyclic amines such as piperidine, morpholine, pyrrolidine, piperazine, and the lower-alkyl derivatives wherein lower alkyl contains one to eight carbon atoms, inclusive thereof such as 1-methylpiperidine, 4-ethylmorpholine, 1-isopropylpyrrolidine, 1,4-dimethylpiperazine, 1-n-butylpiperidine, 2-methylpiperidine and 1-ethyl-2-methylpiperidine; amines containing water solubilizing or hydrophilic groups such as mono-, di-, and triethanolamines, ethyldiethanolamine, n-butyl-monoethanolamine, 2-amino-1-butanol, 2-amino-2-ethyl-1,3-propanediol, 2-amino-2-methyl-1-propanol, tris - (hydroxymethyl)-aminomethane, phenylmonoethanolamine, p-tertiaryamylphenyldiethanolamine, and gelactamine, N-methylglucamine, N-methylglucosamine, ephedrine, phenylephrine, epinephrine, and procaine; tetraethylammonium hydroxide; and guanidine. The various forms can be used interchangeably but for most purposes the zwitterion form:

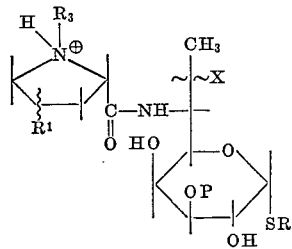

wherein

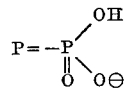

and the hemi-ammonium salt form are preferred.

Further, the invention relates to a process for the therapeutic treatment of humans and animals hosting susceptible microbial disease-producing microorganisms (bacterial and other microparasites) and the prophylactic treatment of a disease-susceptible host comprising the administration of the 3-phosphate esters or a pharmacologically acceptable salt to the host.

The compositions of the present invention are useful in the same manner as lincomycin and celesticetin in the treatment of humans, birds, and animals for various pathological conditions. The compositions provide a means for administering the therapeutic ingredient by the oral and parenteral routes for systemic treatment. The compositions provide a method of therapy for tonsillitis, pneumonia, otitis, conjunctivitis, boils, carbuncles and other infectious conditions of humans due to presence of bacteria. In animals, the compositions can be used prophylactically. For example, rats can be protected from Streptococcus viridans during shipment. Animals raised for meat can be given prophylactic treatment for increased weight gain.

Mammals hosting a parasitic protozoan of the class Sporazoa, order Coccidia (a microparasite producing the disease coccidiosis) can be treated by administration of the compositions of the present invention. For example cattle infected with *E. zurnii, E. bovis, E. illipsordalis;* sheep and goats with *E. parva, E. faurei;* swine with *E. debliecki, E. scabra,* and *Isospora suic;* dogs and cats with *Isospora bigemina, Isospora felis, E. canis, E. felini;* poultry with *E. tenella;* rabbits with *E. steedae, E. perforans;* and mink with *E. mustelae* can be treated.

The compositions are also useful in the treatment of diseases caused by members of the genus Mycoplasma, the most commonly known forms are PPLO (pleuropneumonia-like organisms) such as *M. hominis, M. salivarium, M. mycoides, M. hyopneumonia, M. hyorhinis, M. gallisepticum, M. arthriditis* and other species in man and animals, including domestic animals such as sheep, cattle, swine, and poultry (e.g., chickens, turkeys, ducks, and geese) and laboratory animals (e.g., rats and mice).

The compositions find application in the treatment of kidney and other infections when L forms of gram-negative and gram-positive bacteria are present, for example, L forms of *P. mirabilis.*

The 3-phosphate esters and salts disclosed herein are presented for oral and parenteral administration in solid and liquid unit dosage forms, such as tablets, capsules, powders, granules, pills, sterile parenteral solutions and suspensions, and oral solutions and suspensions, and oil-water emulsions.

Powders are prepared by comminuting the 3-phosphate to a suitably fine size and mixing with a similarly comminuted diluent. The diluent can be edible carbohydrate material such as starch or lactose. Advantageously, a sweetening agent or sugar is present as well as a flavoring material. Dry granulations for reconstitution with water are prepared utilizing water-soluble diluents. A powder mixture of a finely divided 3-phosphate and a water-soluble diluent such as sucrose, glucose, and the like, is wetted with a binder such as acacia mucilage or gelatin solution and forced through a screen to form granules which are allowed to dry. Advantageously, a thickening or suspending agent such as methylcellulose is present as well as wetting agent and flavoring oil.

Capsules are produced by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, wet granulating or dry granulating or slugging, adding a lubricant, and pressing into tablets. The powder mixture is prepared by mixing the 3-phosphate suitably comminuted, with a diluent or base such as starch, lactose, kaolin, dicalcium phosphate and the like. The powder mixture can be granulated by wetting with a binder such as corn syrup, gelatin solution, methylcellulose solution or acacia mucilage and forcing through a screen. As an alternative granulating procedure, the powder mixture can be slugged, i.e., run through the tablet machine and the resulting large tablets (slugs) broken into granules. The granules can be lubricated to prevent sticking to the tablet-forming dies by means of the addition of stearic acid, a stearate salt, talc, or mineral oil. The lubricated mixture is then compressed into tablets. Advantageously, the tablet can be provided with a protective coating consisting of a sealing coat of shellac, a coating of sugar and methylcellulose, and a polish coating of carnauba wax.

Oral fluids are presented in unit dosage forms such as syrups and elixirs wherein each teaspoonful of composition contains a predetermined amount of 3-phosphate for administration.

A syrup is prepared by dispersing the 3-phosphate in a suitable flavored aqueous sucrose solution. Similarly, an elixir is prepared utilizing a hydro-alcoholic vehicle. Elixirs are advantageous vehicles for use when a solution is desired of a compound showing low solubility in water and good solubility in an aqueous-alcoholic medium.

For parenteral administration, sterile fluid unit dosage forms can be prepared. In preparing the parenteral form, a measued amount of the 3-phosphate is placed in a vial; the vial and its contents sterilized and sealed. An accompanying vial of sterile water can be conveniently provided as a vehicle to form a suspension or solution (depending on water-solubility of compound) prior to administration. Advantageously, the sterile water can have dissolved therein a suspending agent, local anesthetic, and buffering agents.

Alternatively, a parenteral suspension having prolonged action can be prepared by suspending the 3-phosphate in a parenterally acceptable vegetable oil with or without additional adjuvants.

The term "unit dosage form" as used in the specification and claims referse to physically discrete units suitable as unitary dosages for human subjects, each unit containing a predetermined quantity of active material calculated to the desired dosage in association with the required pharmaceutical diluent, carrier, or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use as disclosed in detail in this specification, these being features of the present invention. Examples of suitable unit dosage forms in accord with this invention are tablets, capsules, powder packets, granules, wafers, teaspoonfuls, tablespoonfuls, dropperfuls, ampuls, vials, segregated multiples of any of the foregoing, and other forms as herein described. The unit dosage forms compounded with a suitable pharmaceutical carrier contain, in the preferred embodiments, from 25 mg. to 500 mg. of 3-phosphate or its pharmacologically acceptable salts per dosage unit and 5 to 65% w./v. for parenteral preparations.

The amount of 3-phosphate or salts thereof that is to be administered depends on the age and weight of the patient, the particular condition to be treated, and the route of administration. A dose of from about 1 mg./kg./day to about 50 mg./kg./day is preferred for systemic treatment.

The following examples are illustrative of the process and products of the present invention, but are not to be construed as limiting. All percentages are by weight and all solvents mixture proportions are by volume unless otherwise noted.

EXAMPLE 1

Lincomycin 3-phosphate (A) *Fermentation.*—A soil stock of *Streptomyces rochei*, NRRL 3512, is used to inoculate a series of 500-ml. Erlenmeyer flasks, each containing 100 ml. of sterile, seed medium consisting of the following ingredients:

| | G./liter |
|---|---|
| Glucose monohydrate | 25 |
| Pharmamedia[1] | 25 |
| Tap water q.s. balance. | |

[1] Pharmamedia is an industrial grade of cottonseed flour produced by Trader's Oil Mill Company, Fort Worth, Tex.

The shake flasks are grown for 3 days at 28° C. on a rotary shaker.

Seed inoculum (20 ml.), prepared as described above, is used to inoculate each of a series of 500-ml. Erlenmeyer flasks each containing 100 ml. of sterile, fermentation medium consisting of the following ingredients:

| | G./liter |
|---|---|
| Sucrose | 30 |
| Sodium nitrate | 3 |
| Dipotassium phosphate | 1 |
| Magnesium sulphate | 0.5 |
| Potassium chloride | 0.5 |
| Ferrous sulphate | 0.01 |
| Tap water, balance. | |

50 mg./liter lincomycin hydrochloride is added to the fermentation flask broth after autoclaving and before inoculation.

The fermentation flasks are grown for two days at 37° C. on a rotary shaker. The phosphorylating reaction in the fermentation flask is followed by measuring the loss of lincomycin activity using an *S. lutea* standard curve assay. Approximately 80–90% of the added lincomycin is phosphorylated to an antibacterially inactive form in vitro in 48 hrs. The *S. lutea* assay is conducted as follows: The assay is on agar buffered to pH 6–8 with pH 7.0 phosphate buffer (0.1 M.). A unit volume (0.08 ml.) of solution containing the material to be assayed is placed on a 12.7 mm. assay disc which is then placed on an agar plate seeded with the assay microorganism. A biounit is that amount of material which, when contained in one ml. of solution, gives a zone of inhibition of 20 mm.

(B) *Recovery.*—The above fermentation is scaled up into a fermentation tank to produce 4900 liters of fermentation beer containing lincomycin 3-phosphate. The lincomycin 3-phosphate is recovered from the whole beer by first filtering the whole beer with the aid of 2% diatomaceous filter aid. The clear beer is then extracted with 400 liters of Skellysolve B (isomeric hexanes). The pH of the clear beer is adjusted to a pH of about 5.9 and then extracted with about 450 liters of a 9% solution of sodium dinonylnaphthalene-sulfonate (NaDNNS) in Skellysolve B. This extraction is repeated once. A third extraction of the beer is conducted with 300 liters of Skellysolve B. All of the above extracts are pooled and washed with 200 liters of water. The washed NaDNNS extract is extracted with 800 liters of 25% Aliquat 336 (tricaprylmethylammonium chloride) in Skellysolve B and 200 liters of water. The extract is then extracted two more times with water and the aqueous is extracted with 200 liters of Skellysolve B. The pH of the aqueous is adjusted to 4.0 and concentrated down to 185 liters in vacuo. Activated carbon (11.2 kg.) is added to this concentrate and the mixture agitated for 30 minutes. Filter aid (4 kg.) is added to the carbon mixture and the mixture is then filtered. The resulting cake is washed with 180 liters of water, followed by 5% acetone. The cake is then extracted 3 times with 25% acetone using 180 liters each time. The 25% acetone eluates are pooled, concentrated in vacuo, and freeze dried to give a freeze-dried preparation of lincomycin 3-phosphate.

Upon subjecting this freeze-dried preparation of lincomycin 3-phosphate to phromatography column purification followed by counter current distribution as described in Example 2 for the preparation of clinimycin-3-phosphate, there is obtained a pure preparation of lincomycin 3-phosphate zwitterion.

Characterization of lincomycin-3-phosphate

*Infrared spectrum.*—The infrared absorption spectrum of lincomycin-3-phosphate zwitterion suspended in mineral oil mull is shown by the peaks at the following wave lengths expressed in reciprocal centimeters:

3330 (s.), 3070 (s.), 2920 (s., oil), 2850 (s., oil), 2730 (m.), 2400 (m.), 1670 (s.), 1565 (s.), 1535 (s.), 1460 (s., oil), 1375 (s., oil), 1300 (s.), 1240 (s.), 1160 (s.), 1092 (s.), 1070 (s.), 1048 (s.), 995 (s.), 970 (s.), 925 (s.), 877 (s.), 845 (m.), 777 (m.), 735 (m.), 720 (m.).

The infrared absorption spectrum of lincomycin-3-phosphate zwitterion pressed in a KBr disc is shown by the peaks at the following wave lengths expressed in reciprocal centimeters:

3400 (s.), 3250 (s.), 3070 (s.), 2960 (s.), 2930 (s.), 2870 (s.), 1675 (s.), 1650 (s.), 1620 (s.), 1563 (s.), 1537 (m.), 1460 (m.), 1450 (m.), 1382 (s.), 1320 (s.), 1305 (s.), 1255 (s.), 1180 (s.), 1090 (s.), 1070 (s.), 1048 (s.), 995 (s.), 975 (s.), 920 (s.), 878 (s.), 843 (m.), 780 (m.), 740 (m.), 700 (m.).

*Hydrolysis rate.*—In pooled human serum lincomycin 3-phosphate hydrolyzes significantly slower than lincomycin-2-phosphate.

*Titration.*—Equivalent weight found =289.

*Specific rotation.*—$[\alpha]_D^{25} + 127°$ (c. 0.689 water).

In vivo antibacterial activity of lincomycin-3-phosphate: $CD_{50}$ is approximately 30 mg./kg. (subcutaneously, *S. aureus* infected mice).

EXAMPLE 2

Clinimycin-3-phosphate (A) *Fermentation.*—A soil stock of *Streptomyces coelicolor*, NRRL 3532, is used to inoculate a series of 500-ml. Erlenmeyer flasks, each containing 100 ml. of sterile, seed medium consisting of the following ingredients:

| | G./liter |
|---|---|
| Glucose monohydrate | 25 |
| Pharmamedia | 25 |

Tap water q.s., balance.

The shake flasks are grown for three days at 28° C. on a rotary shaker.

Seed inoculum (5 ml.), prepared as described above, is used to inoculate each of a series of 500-ml. Erlenmeyer flasks, each containing 100 ml. sterile, fermentation medium consisting of the following ingredients:

| | G./liter |
|---|---|
| Sodium nitrate | 3 |
| Dipotassium phosphate | 1 |
| Magnesium sulfate | 0.5 |
| Potassium chloride | 0.5 |
| Ferrous sulfate | 0.01 |
| Glucose monohydrate | 20.0 |
| Yeast extract | 2.5 |
| NZ amine B [1] | 5.0 |

Tap water, balance.

[1] Sold by Sheffield Laboratories, Detroit, Mich.

Clinicycin, 50 mg./liter, is added to each fermentation flask 24 hours after inoculation. The fermentation flasks are grown for 2 days at 28° C. on a rotary shaker. The phosphorylation reaction is followed by measuring the loss of clinimycin activity using an *S. lutea* assay. Presence of clinimycin-3-phosphate is determined by incubation of the inactive beer with alkaline phosphatase at pH 8.0 and Tris buffer, and assaying the reaction mixture against *S. lutea*.

(B) *Recovery.*—Whole beer (approximately 12 liters), obtained from a fermentation as described above, is filtered using diatomaceous earth as a filter aid. The cake is washed with 2 liters of water. The aqueous wash is combined with the clear beer and the combined clear beer-wash is treated with an adsorbent, for example, carbon or Amberlite XAD-2 (sold by Rohm and Haas Co.) in order to remove water-soluble impurities which tend to reduce the efficiency of subsequent chromatography. The adsorbtion column is prepared by slurring about 600 g. of adsorbent (carbon or Amberlite XAD-2) in water, pouring the slurry into a glass column (2" inside diameter), and allowing the slurry to settle under atmospheric pressure. The clear beer-wash, described above, is passed through the column. The spent beer is collected as one fraction and labeled A. The column is then washed with water. The aqueous wash is collected and labeled fraction B. The column is then eluted with 5 liters of 60% aqueous methanol. A total of 200 fractions are collected. The column is then eluted with 2 liters of 95% aqueous methanol. This eluate is collected as one fraction. All fractions collected are tested for activity against the microorganism *S. lutea* before and after treatment with alkaline phosphatase is order to determine the presence of clinimycin-3-phosphate. The results of these tests are presented below:

| | Zone size (mm.) | |
|---|---|---|
| Description of fraction | Control (before phosphatase treatment) | After alkaline phosphatase treatment |
| Clear beer-wash | 26 | 36 |
| Spent beer fraction A | 0 | 0 |
| Aqueous wash Fraction B | 0 | 28 |
| 60% aqueous methanol, Fractoin No.: | | |
| 5 | 19 | 30 |
| 10 | 0 | 27 |
| 15 | 0 | 22 |
| 20 | 0 | 22 |
| 25 | 18.5 | 23 |
| 30 | 20 | 41 |
| 35 | 22 | 42 |
| 40 | 23 | 46 |
| 45 | 26 | 47 |
| 50 | 25 | 46 |
| 60 | 25 | 45 |
| 70 | 23 | 44 |
| 80 | 23 | 44 |
| 90 | 22 | 44 |
| 100 | 21 | 43 |
| 120 | 20 | 43 |
| 140 | 18 | 41 |
| 160 | 18 | 38 |
| 180 | 17 | 38 |
| 200 | 18 | 37 |
| 95% aqueous methanol | 37 | 41 |

Fractions 25–200 obtained by elution of the column with 60% aqueous methanol are combined and the solution labeled C (approximately 4 liters). This material is then chromatographed over an anion exchange chromatographic column. The column is filed with Dowex-1 (X-4) in the acetate form supplied by Dow Chemical Co., Midland, Mich. Solution C (4 liters) from the adsorbent column, described above, is adjusted to a pH of 10.0 with aqueous ammonium hydroxide and the alkaline solution is passed through the chromatography column. The effluent is collected in four 1-liter fractions which are designated Spent-1, Spent-2, Spent-3, and Spent-4. The Column is then washed with 2 liters of water and labeled Aqueous Wash. The column is then eluted with 5% aqueous acetic acid. Fractions of 20 ml. are collected. Selected fractions were tested for activity against *S. lutea* before and after treatment with alkaline phosphatase. Results are reported below.

| | Zone size (mm.) | |
|---|---|---|
| Description | Control (before phosphatase treatment) | After alkaline phosphatase treatment |
| Starting material (Solution C) | 23 | 43 |
| Spent-1 | 20.5 | 21 |
| Spent-2 | 21 | 22 |
| Spent-3 | 21.5 | 21.5 |
| Spent-4 | 20.5 | 23 |
| Aqueous wash | 16 | 16 |
| 5% acetic acid, fraction No.: | | |
| 20 | 15 | 15 |
| 25 | 25 | 52 |
| 30 | 29 | 51 |
| 35 | 26 | 50 |
| 40 | 25 | 47.5 |
| 45 | 19 | 42.5 |
| 50 | 18 | 39 |
| 60 | 16 | 31 |
| 70 | 16 | 26 |
| 80 | 16 | 22 |
| 90 | 16 | 20 |
| 100 | 16 | 17 |
| 120 | 16 | 17 |
| 140 | 16 | 17 |
| 160 | 16 | 16 |
| 180 | 16 | 16 |
| 200 | 16 | 16 |

Fractions 22–70, obtained by elution of the column with 5% aqueous acetic acid, are combined and the solution is freeze dried to give 2.59 g. of a preparation labeled D. 2 g. of this preparation D is subjected to counter-current distribution using a solvent system consisting of n-butanol-water (1:1 v./v.). The countercurrent distribution machine holds 10 ml./phase and the distribution is for 500 transfers. After 500 transfers, selected tubes are analyzed for *S. lutea* activity, as described above, before and after treatment with alkaline phosphatase. Fractions 200–300 are combined. The solution is concentrated to dryness in vacuo and the residue is then dissolved in 5 ml. of methanol. This solution is mixed with acetone, ether, and 1 ml. of 1 N methanolic hydrogen chloride. The resulting precipitate of clinimycin-3-phosphate is isolated by filtration, and dried; yield, 300 mg. The characterization of this preparation of clinimycin-3-phosphate is as follows:

*Infrared spectrum.*—The infrared absorption spectrum of clinimycin-3-phosphate suspended in mineral oil mull is shown by the peaks at the following wave lengths expressed in reciprocal centimeters:

3300 (s.), 3055 (s.), 3940 (s., oil), 2845 (s., oil), 2720 (s.), 2680 (s.), 1718 (s., sh.), 1705 (s., sh.), 1700 (s., sh,), 1685 (s.), 1675 (s.), 1652 (s., sh.), 1625 (s., sh.), 1575 (s., sh.), 1570 (s., sh.), 1555 (s.), 1532 (s.), 1520 (s., sh.), 1505 (s., sh.), 1470 (s., sh.), 1458 (s., oil), 1435 (s., sh.), 1385 (s., sh.,), 1375 (s., oil), 1365 (s., sh.), 1310 (s.), 1258 (s.), 1220 (s.), 1148 (s.), 1098 (s.), 1070 (s.), 1040 (s.), 987 (s.), 960 (s.), 880 (m.), 855 (m.), 815 (m.), 780 (m.), 720 (m.)

The I.R. spectrum of clinimycin-3-phosphate pressed in a KBr disc is shown by the peaks at the following wave lengths expressed in reciprocal centimeters:

3430 (s.), 3230 (s.), 3070 (s.), 2960 (s.), 2930 (s.), 2870 (s.), 1685 (s.), 1680 (s.), 1635 (m.), 1560 (m.), 1540 (w.), 1455 (w.), 1384 (m.), 1315 (w.), 1255 (m.), 1220 (m.), 1150 (m.), 1095 (s.), 1073 (s.), 1045 (m.), 989 (w.), 930 (w.), 880 (w.), 855 (w.), 780 (w.)

Band intensities in the I.R. spectra, disclosed herein, are indicated as s., m., and w., respectively, and are approximated in terms of the backgrounds in the vicinity of the bands. An s. band is of the same order of intensity as the strongest in the spectrum; m. bands are between one-third and two-thirds as intense as the strongest band, and w. bands are less than one-third as intense as the strongest band. These estimates are made on the basis of a percent transmission scale.

In vivo antibacterial activity of clinimycin-3-phosphate: $CD_{50}$ is 15 (10–23) mg./kg. (subcutaneously, *Staphylococcus aureus* infected mice).

Clinimycin-3-phosphate is inactive in vitro against the following microorganisms up to and including a level of 1000γ per ml. of cyinimycin-3-phosphate: *B. subtilis, S. aureus, M. avium, K. pneumoniae, E. coli, S. schottmuelleri, Proteus vulgaris* M.R., *S. lutea, S. pastorianus.*

EXAMPLE 3

1'-dimethylclinimycin-3-phosphate

Whole beer (approximatelqy 12 liters), obtained from a fermentation as described in Example 2 wherein 1'-demethylclinimycin is added to the fermentation medium at a level of 50 γ/ml., is filtered using diatomaceous earth as filter aid. The resulting cake is washed with 1 liter of water. The aqueous wash is combined with the clear beer and the combined clear beer-wash is chromatographed over a chromatography column. The column is a Dowex–1 (X–4) in the acetate form. The clear beer-wash, described above, is adjusted to pH 10.0 with aqueous ammonium hydroxide and this solution is passed through the column. The effluent is collected in three 4-liter fractions designated Spent–1, Spent–2, and Spent–3. The column is then washed with 4 liters of water collected in two 2 liter fractions designated Wash–1 and Wash–2. The column is then eluted with a 5% aqueous acetic acid solution. Seven 1-liter-fractions are collected and these are designated Eluate–1 to Eluate–7, respectively. All fractions are tested for activity against *S. lutea* before and after alkaline phosphatase treatment. Eluates 2 to 7 are then combined and the solution is freeze dried to give 16.98 g. of a freeze-dried preparation containing 1'-demethylclinimycin-3-phosphate. This material is subjected to countercurrent distribution using a solvent system consisting of n-butanol-water (1:1 v./v.). The countercurrent distribution machine holds 10 ml./phase. After 500 transfers, selected tubes are analyzed for *S. lutea* activity before and after treatment with alkaline phosphatase. Fractions in tubes 220–250 are pooled and concentrated to an aqueous and the solution freeze-dried; yield, 370 mg. of 1'-demethylclinimycin-3-phosphate.

1'-demethylclinimycin-3-phosphate has the following structural formula:

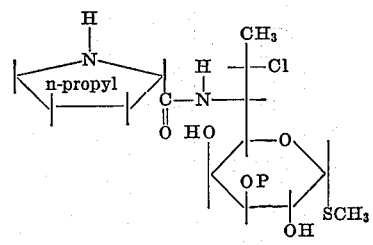

wherein:

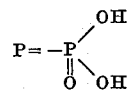

EXAMPLE 4

1'-demethyl-4''-depropyl-4'-pentyl-clinimycin-3-phosphate

Whole beer (approximately 12 liters), obtained from a fermentation as described in Example 2 wherein 1'-demethyl-4'-depropyl-4'-pentyl-clinimycin is added to the fermentation medium at a level of 50 γ/ml. is filtered using diatomaceous earth as filter aid. The resulting cake is washed with 1 liter of water. The aqueous wash is combined with the clear beer and the combined clear beer-wash is chromatographed on a chromatography column. The column is a Dowex–1 (X–4) in the acetate form. The chromatographic process described above in Example 3 is followed. The fractions collected are tested for *S. lutea* activity before and after treatment with alkaline phosphatase. Eluates 2–7 are combined and the solution is freeze-dried to give 18.63 g. of a freeze-dried preparation of 1'-demethyl-4'-depropyl - 4' - pentyl - clinimycin - 3-phosphate. This material is purified by subjecting it to countercurrent distribution as described above in Example 3. After 500 transfers, selected tubes are analyzed for *S. lutea* activity before and after treatment with alkaline phosphatase. Fractions from tubes 380–400 are pooled, concentrated to an aqueous solution which is then freeze-dried to a preparation containing 1'-demethyl-4'-depropyl-4'-pentyl-clinimycin-3-phosphate.

1' - demethyl - 4' - depropyl - 4' - pentyl-clinimycin-3-phosphate has the following structural formula:

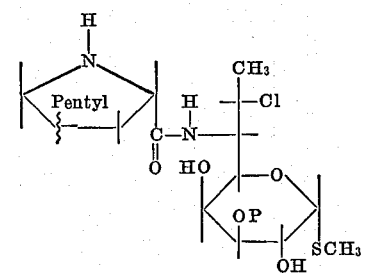

wherein:

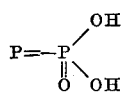

EXAMPLE 5

Upon substituting 4′-depropyl-4′-ethyl lincomycin in the fermentation medium in Example 1 for lincomycin, there is obtained 4′-depropyl-4′-ethyl lincomycin-3-phosphate.

EXAMPLE 6

Upon substituting 1′-demethyl-1′-ethyl lincomycin in the fermentation medium in Example 1 for lincomycin, there is obtained 1′-demethyl-1′-ethyl lincomycin-3-phosphate.

EXAMPLE 7

Upon substituting 1′-demethyl lincomycin in the fermentation medium in Example 1 for lincomycin, there is obtained 1′-demethyl lincomycin-3-phosphate.

EXAMPLE 8

Upon substituting celesticetin in the fermentation medium in Example 2 for clinimycin, there is obtained celesticetin-3-phosphate.

EXAMPLE 9

The unphosphorylated compounds of Examples 1–8 are separately incubated with a cell-free extract of a Streptomyces culture grown in a modified Czapek's-Dox medium. Cells are disrupted by either sonicating 4 minutes in 0.04 M. phosphate buffer, pH 7.5, or glycylglycine buffer, 0.1 M., pH 8.0, or lysing with egg white lysozyme for 1 hr. at 28° C. Modified Czapek's-Dox medium consists of the following:

| | Q./l.¹ |
|---|---|
| $NaNO_3$ | 1.5 |
| $(NH_4)_2SO_4$ | 1.5 |
| $CaCO_3$ | 5.0 |
| $K_2HPO_4$ | 1.0 |
| $MgSO_4$ | 0.5 |
| KCl | 0.5 |
| $FeSO_4 \cdot 7H_2O$ | 0.01 |
| Glucose monohydrate | 20.0 |
| Difco yeast extract | 2.5 |
| NZ amine B | 5.0 |

¹ 1 liter $H_2O$ pH 7.2 before autoclaving pH 7.2 after autoclaving.

Lystates or sonicates are spun at 30,000×G for 20 minutes to yield a cell-free active supernatant stable to storage in liquid nitrogen. The reaction mixture and reagent for the transphosphorylation reaction are as follows:

Reagent:
    Adenosine triphosphate—0.1 M., pH 8.0
    $MgCl_2$—0.2 M.
    Glycylglycine—0.1 M., pH 8.0

Reaction mixture:
    $MgCl_2$—0.1 M.
    Adenosin triphosphate—0.1 ml.
    Substrate (e.g. unphosphorylated compound.)—0.2 ml.
    Enzyme in glycylglycine or phosphate buffer—0.5 ml.
    Incubate 24 hrs. at 28° C.

Upon completion of the above reaction, there is obtained the phosphorylated compounds disclosed in Examples 1–8.

EXAMPLE 10

Part A.—Lincomycin-3-phosphate diammonium salt

Lincomycin-3-phosphate in the zwitterionic form is dissolved in a minimum amount of water and diluted with an equal amount of ethanol. The solution is cooled in an ice-water bath and then saturated with ammonia gas. The white precipitate of diammonium phosphate is removed by filtration and the filtrate is taken to dryness at 30° C. under high vacuum. The residue is dissolved in a minimum amount of methanol and diluted with 5 volumes of ether to precipitate lincomycin-3-phosphate as the ammonium salt.

Part B.—Lincomycin-3-phosphate hemi-ammonium salt

The hemi-ammonium salt is obtained in the following manner. A solution of 1.0 gram of ammonium lincomycin-3-phosphate of Part A is dissolved in 4 ml. water. The colorless solution is diluted with 0.25 ml. acetic acid and then diluted with 30 ml. acetone (the point of incipient turbidity). Crystallization occurs very rapidly. After cooling in a refrigerator for eight hours, the crystals are isolated by filtration, washed with 5 ml. acetone-water (95–5) and then with 20 ml. acetone. The white crystalline of lincomycin-3-phosphate hemi-ammonium salt is isolated by filtration and dried.

EXAMPLE 11

Aqueous oral drops

| | Gm. |
|---|---|
| Lincomycin - 3 - phosphate | 100 |
| Propyl paraben | 0.25 |
| Methyl paraben | 0.75 |
| Sorbic acid | 1.0 |

Sodium hydroxide, 4 N aqueous q.s. to pH 7.5.
Water, deionized q.s. 1000 ml.

EXAMPLE 12

Syrup

An aqueous oral preparation containing 400 mg. of lincomycin-3-phosphate in each five milliliters is prepared from the following ingreditents:

Lincomycin-3-phosphate—800 gm.
Methylparaben, U.S.P.—7.5 gm.
Propylparaben, U.S.P.—2.5 gm.
Sorbic acid—10 gm.
Saccharin sodium—6.5 gm.
Glycerin—3000 ml.
Tragacanth powder—100 gm.
Orange oil flavor—10 gm.
F.D.&C. orange dye—7.5 gm.
Sodium hydroxide, 4 N aqueous q.s. pH 7.5.
Deionized water q.s. 10,000 ml.

In place of lincomycin-3-phosphate in Examples 11 and 12, there can be substituted 7(S)-chloro-7-deoxy-lincomycin-3-phosphate, as well as the water soluble salts of lincomycin-3-phosphate and 7(S)-chloro-7-deoxylincomycin-3-phosphate, for example, the alkali metal salts including the ammonium salt. Either the hemi-, mono-, or di- salt can be used.

The aqueous formulations of Examples 11 and 12 are particularly useful as pediatric preparations and can be administered orally in the same dosages as lincomycin.

EXAMPLE 13

Capsules

One thousand two-piece hard gelatin capsules for oral use, each containing 350 mg. of 1′-demethylclinimycin-3-phosphate are prepared from the following types and amounts of materials:

| | Gm. |
|---|---|
| 1′-demethylclinimycin-3-phosphate | 350 |
| Corn starch | 50 |
| Talc | 25 |
| Magnesium stearate | 2.5 |

The materials are thoroughly mixed and then encapsulated in the usual manner.

The foregoing capsules are useful for the systemic treatment of infection in adult humans by the oral administration of 1 capsule every 4 hours.

Using the procedure above, capsules are similarly prepared with 1'-demethylclinimycin-3-phosphate in 50, 125, 250, and 500 mg. amounts by substituting 50, 125, 250, and 500 gm. of 1'-demethylclinimycin-3-phosphate for the 350 gm. used above.

EXAMPLE 14

Tablets

One thousand tablets for oral use, each containing 500 mg. of 1'-demethyl - 4' - depropyl-4'-pentylclinimycin-3-phosphate are prepared from the following types and amounts of materials:

| | Gm. |
|---|---|
| 1' - demethyl - 4' - depropyl-4'-pentylclinimycin-3-phosphate | 500 |
| Lactose | 50 |
| Corn starch | 65 |
| Magnesium stearate | 3 |
| Light liquid petrolatum | 3 |

The ingredients are thoroughly mixed and slugged. The slugs are broken down by forcing through a number sixteen screen. The resulting granules are then compressed into tablets, each tablet containing 500 mg. of active material.

The foregoing tablets are useful for systemic treatment of infections in adult humans by oral administration of 1 tablet every 4 hours.

Using the above procedure, except for reducing the amount of active material to 200 gm., tablets containing 200 mg. of active material are prepared.

EXAMPLE 15

Parenteral preparation

A sterile aqueous preparation for intramuscular use, containing in 1 ml. 300 mg. of celesticetin-3-phosphate is prepared from the following types and amounts of materials:

| | Gm. |
|---|---|
| Celesticetin-3-phosphate | 300 |
| Benzyl alcohol | 9 |
| Water for injection, q.s. 1000 ml. | |

The sterile drug is dispersed in the sterile benzyl alcohol-water vehicle and filled into vials and the vials sealed.

EXAMPLE 16

Animal feed

One thousand gm. of a feed mix is prepared from the following types and amounts of ingredients:

| | Gm. |
|---|---|
| 4'-depropyl-4'-ethyl lincomycin-3-phosphate | 20 |
| Soybean meal | 400 |
| Fish meal | 400 |
| Wheat germ oil | 50 |
| Sorghum molasses | 140 |

The ingredients are mixed together and pressed into pellets.

The composition can be fed to laboratory animals, i.e., rats, mice, guinea pigs, and rabbits for prophylaxis during shipping.

For larger animals the composition can be added to the animal's regular feed in an amount calculated to give the desired dose of active material.

EXAMPLE 17

Parenteral preparation

A sterile aqueous preparation for intramuscular use, containing in 1 ml. 300 mg. of lincomycin-3-phosphate is prepared from the following types and amounts of materials:

| | Gm. |
|---|---|
| Lincomycin-3-phosphate | 300 |
| Benzyl alcohol | 9 |
| Water for injection, q.s. 1000 ml. | |

The sterile drug is dispersed in the sterile benzyl alcohol-water vehicle and filled into vials and the vials sealed.

The above parenteral preparation gives a more prolonged medication than a comparable preparation containing lincomycin-2-phosphate because lincomycin-3-phosphate hydrolysis is slower than lincomycin-2-phosphate.

What is claimed is:

1. A compound of the formula:

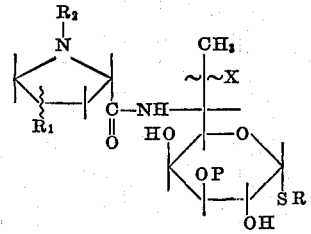

and the pharmacologically acceptable salts thereof, wherein R is $CH_3-$, $C_2H_5-$, or

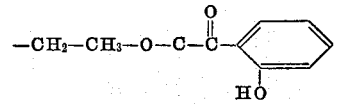

$R_1$ is H or cis or trans lower-alkyl of from 1 to 8 carbon atoms; $R_2$ is H, $CH_3$, or $C_2H_5$, X is OH, chlorine, or bromine, each in the (R) or (S) configuration, or $-OCH_3$; and P is

2. The zwitterion form of the compound of claim 1.
3. A compound according to claim 1 having the formula:

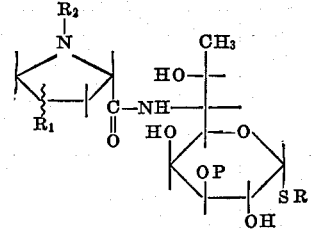

and the pharmacologically acceptable salts thereof, wherein R, $R_1$ and $R_2$ are as given in claim 1, and P is

4. A compound according to claim 3 having the formula:

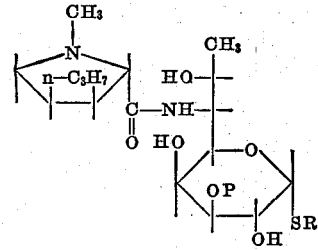

and the pharmacologically acceptable salts thereof, wherein P is

and R is CH$_3$.

5. A compound according to claim 3 having the formula:

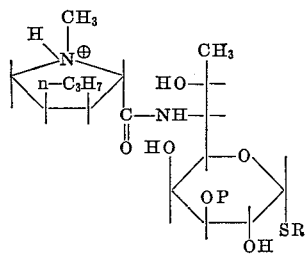

wherein P is

and R is CH$_3$.

6. A compound according to claim 1 having the formula:

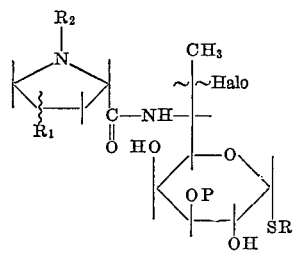

and the pharmacologically acceptable salts thereof, wherein halo is chlorine or bromine and R, R$_1$, R$_2$ and P are as given in claim 1.

7. A compound according to claim 6 having the formula:

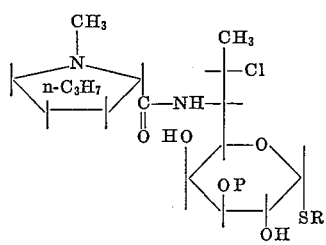

and the pharmacologically acceptable salts thereof, wherein P is

and R is CH$_3$.

8. A compound according to claim 6 having the formula:

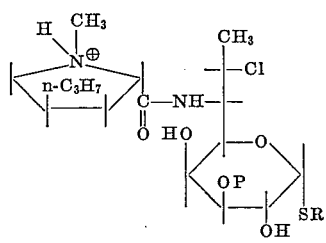

wherein P is

and R is CH$_3$.

9. A compound according to claim 1 having the formula:

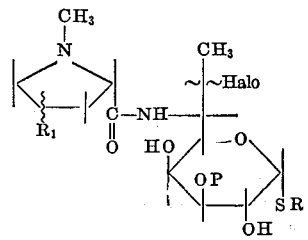

and pharmacologically acceptable salts thereof, wherein halo is chlorine or bromine; R is CH$_3$; R$_1$ is pentyl; and P is

10. A compound according to claim 9 having the formula:

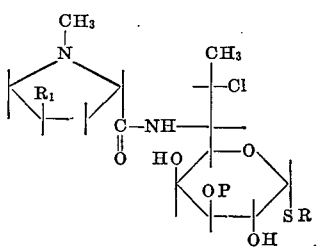

and pharmacologically acceptable salts thereof, wherein R is CH$_3$; R$_1$ is pentyl; and P is

11. A compound according to claim 9 having the formula:

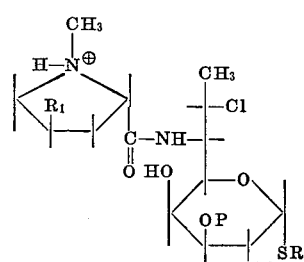

wherein P is

R is CH$_3$; and R$_1$ is pentyl.

12. A compound according to claim 1 having the formula:

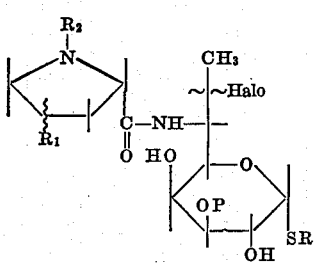

and pharmacologically acceptable salts thereof, wherein halo is chlorine or bromine; R is $CH_3$; $R_1$ is pentyl; $R_2$ is H; and P is

13. A compound according to claim 12 having the formula:

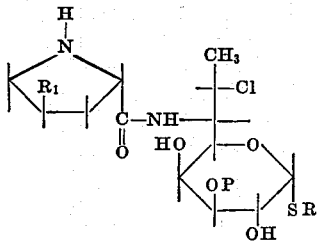

and pharmacologically acceptable salts thereof, wherein R is $CH_3$; $R_1$ is pentyl; and P is

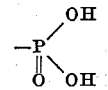

14. A compound according to claim 12 having the formula:

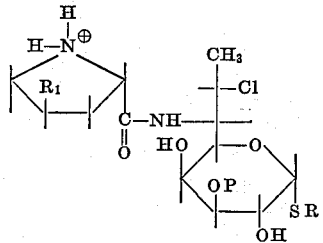

wherein R is $CH_3$; $R_1$ is pentyl; and P is

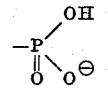

References Cited
UNITED STATES PATENTS 3,346,635   10/1967   Bannister et al. _____ 260—210
3,415,811   12/1968   Argoudelis et al. \_\_\_\_ 260—210

LEWIS GOTTS, Primary Examiner

J. R. BROWN, Assistant Examiner

U.S. Cl. X.R.
195—80; 424—180